United States Patent [19]

Iadonato et al.

[11] Patent Number: 5,604,912
[45] Date of Patent: Feb. 18, 1997

[54] SYSTEM AND METHOD FOR ASSIGNING TAGS TO INSTRUCTIONS TO CONTROL INSTRUCTION EXECUTION

[75] Inventors: Kevin R. Iadonato, San Jose; Trevor A. Deosaran, Sunnyvale; Sanjiv Garg, Fremont, all of Calif.

[73] Assignee: Seiko Epson Corporation, Japan

[21] Appl. No.: 999,648

[22] Filed: Dec. 31, 1992

[51] Int. Cl.$^6$ ........................................ G06F 9/38
[52] U.S. Cl. .................. 395/800; 395/384; 364/DIG. 1; 364/262.4; 364/232.23; 364/228.9; 364/251.7
[58] Field of Search .................................. 395/800, 425, 395/375, 437, 421.4

[56] References Cited

U.S. PATENT DOCUMENTS

| | | | |
|---|---|---|---|
| 4,881,167 | 11/1989 | Sasaki et al. | 364/200 |
| 4,903,196 | 2/1990 | Pomerene et al. | 395/375 |
| 4,992,938 | 2/1991 | Cocke et al. | 395/375 |
| 5,067,069 | 11/1991 | Fite et al. | 395/375 |
| 5,109,495 | 4/1992 | Fite et al. | 395/375 |
| 5,125,083 | 6/1992 | Fite et al. | 395/375 |
| 5,142,633 | 8/1992 | Murray et al. | 395/375 |
| 5,214,763 | 5/1993 | Blamer et al. | 395/375 |
| 5,226,126 | 7/1993 | McFarland et al. | 395/375 |
| 5,251,306 | 10/1993 | Tran | 395/375 |
| 5,255,384 | 10/1993 | Sachs et al. | 395/375 |
| 5,261,071 | 11/1993 | Lyon | 395/425 |
| 5,285,527 | 2/1994 | Crick et al. | 395/425 |
| 5,317,720 | 3/1994 | Stamm et al. | 395/375 |
| 5,345,569 | 9/1994 | Tran | 395/375 |
| 5,398,330 | 3/1995 | Johnson | 395/575 |
| 5,487,156 | 1/1996 | Popescu et al. | 395/375 |

FOREIGN PATENT DOCUMENTS

| | | |
|---|---|---|
| 0378195 | 7/1990 | European Pat. Off. . |
| 0515166 | 11/1992 | European Pat. Off. . |
| WO8809035 | 11/1988 | WIPO . |

OTHER PUBLICATIONS

John L. Hennessy and David A. Patterson, *Computer Architecture A Quantitative Approach*, Ch. 6.4, 6.7, and p. 449, 1990.

Bruce D. Lightner and Gene Hill, "The Metaflow Lightning Chipset*", pp. 13–16, *IEEE Publication*, 1991.

Peleg et al., "Future Trends in Microprocessors: Out-of-Order Executions, Spec. Branching and Theis CISC Performance Potential", Mar. 1991.

Dwyer, *A Multiple, Out-of-Order Instruction Issuing System for Superscalar Processors*, (All), Aug. 1991.

Keller, R., "Look-Ahead Processors", *Computing Surveys*, vol. 7, No. 4, Dec. 1975.

*Critical Issues Regarding HPS, A High Performance Microarchitecture*, Yale N. Patt, Stephen W. Melvin, Wen-mei Hwu, and Michael C. Shebanow; The 18th Annual Workshop on Microprogramming, Pacific Grove, California, Dec. 3–6, 1985; IEEE Computer Order No. 653, pp. 109–116.

(List continued on next page.)

*Primary Examiner*—Larry D. Donaghue
*Attorney, Agent, or Firm*—Sterne, Kessler, Goldstein & Fox P.L.L.C.

[57] ABSTRACT

Tag monitoring system for assigning tags to instructions. A memory unit stores instructions to be executed by an execution unit. Before execution an instruction fetch unit decodes the instructions. A register file stores the decoded instructions. A queue having a plurality of slots containing tags which are used for tagging the decoded instructions. A control unit assigns the tags to decoded instructions, monitors the completion of executed instructions, and advances the tags in the queue upon completion of an executed instruction. The register stores a given decoded instruction at an address location in the register file defined by the tag assigned to that instruction. The register file also contains a plurality of read address enable ports and corresponding read output ports. Each of the slots from the queue is coupled to a corresponding one of the read address enable ports. Thus, a a decoded instruction is read out of a read output port enabled by the tag assigned to that decoded instruction in program order.

40 Claims, 3 Drawing Sheets

OTHER PUBLICATIONS

*HPS, A New Microarchitecture: Rationale and Introduction,* Yale N. Patt, Wen-mei Hwu, and Michael Shebanow; The 18th Annual Workshop on Microprogramming, Pacific Grove, California, Dec. 3–6, 1985; IEEE Computer Society Order No. 653, pp. 103–108.

Popescu et al., *The Metaflow Architecture,* IEEE Micro, vol. 11, No. 3, Jun. 1991, pp. 10–13 and 63–73.

Johnson, *Superscalar Microprocessor Design,* (Prentice–Hall), Inc., Englewood Cliffs, New Jersey, 1991).

SYSTEM AND METHOD FOR ASSIGNING TAGS TO INSTRUCTIONS TO CONTROL INSTRUCTION EXECUTION

BACKGROUND OF THE INVENTION

1. Field of the Invention

The present invention relates generally to superscalar computers, and more particularly, a system and method for using tags to control instruction execution in a superscalar reduced instruction set computer (RISC).

2. Related Art

Processors used in conventional computer systems typically execute program instructions one at a time, in sequential order. The process of executing a single instruction involves several sequential steps. The first step generally involves fetching the instruction from a memory device. The second step generally involves decoding the instruction, and assembling any operands.

The third step generally involves executing the instruction, and storing the results. Some processors are designed to perform each step in a single cycle of the processor clock. Alternatively, the processor may be designed so that the number of processor clock cycles per step depends on the particular instruction.

Modern computers commonly use a technique known as pipelining to improve performance. Pipelining involves the overlapping of the sequential steps of the execution process. For example, while the processor is performing the execution step for one instruction, it might simultaneously perform the decode step for a second instruction, and perform a fetch of a third instruction. Pipelining can thus decrease the execution time for a sequence of instructions. Superpipelined processors attempt to further improve performance by overlapping the sub-steps of the three sequential steps discussed above.

Another technique for improving performance involves executing more than one instruction in parallel, simultaneously. Processors which utilize this technique are generally referred to as superscalar processors. The ability of a superscalar processor to execute two or more instructions simultaneously depends upon the particular instructions being executed. For example, two instructions which both require use of the same, limited processor resource (such as the floating point unit) cannot be executed simultaneously. This type of conflict is known as a resource conflict. Additionally, an instruction which depends on the result produced by execution of a previous instruction cannot be bundled with that previous instruction. The instruction which depends on the result of the previous instruction is said to have a data dependency on the first instruction. Similarly, an instruction may have a procedural dependency on a previous instruction, which prevents the two instructions from being executed simultaneously.

Thus, a superscalar processor seeks to execute more than one instruction at a time. In order to do this a processor must contain a system for executing multiple instructions called an Execution Unit (e.g., floating point unit and integer unit, etc.). The Execution Unit must be supplied with a group of instructions that it is to execute in the near future. This group of instructions are typically located in a so called "instruction window." The Window provides a "snap-shot" of an instruction program.

The above mentioned Window is normally located in an Instruction Fetch Unit. The Instruction Fetch Unit fetches a group of instructions from memory; decodes the instructions and sends them to a Superscalar Unit. The Superscalar Unit issues the instructions to the various functional units. The Super-Scalar unit needs information showing which of the microprocessor's resources the instruction will use (e.g., Load/Store); the names of registers where an instruction's inputs will come from (e.g., integer unit register file) and where its output will go to (e.g., floating-point unit register file), information indicating what function the instruction will perform (e.g., add, multiply), etc.

As a result of knowing this information, once the instructions are completed, the Superscalar Unit notifies the Instruction Fetch Unit to remove them from the window and add new instructions to take their place.

Current designs employ an instruction window that utilizes a First In First Out queue (FIFO). The dam in the FIFO can only be advanced a "fixed amount." For example, an instruction window might contain four instructions (I0–I3) and may be changed in groups of four. In this case, after instructions I0, I1, I2, and I3 have executed, they are removed from the window and four more instructions are advanced into the window. The Superscalar Unit can easily follow the progress of the instructions through the window, since the window changes by a fixed amount each time a group of instructions are completed.

Fixed advance windows have some drawbacks. One instruction can delay the group instructions from being removed from the window. For example, if I0, I1, I2 are instructions that all execute in one cycle, and I3 is an instruction that requires many cycles to execute, then I0, I1, and I2 will have to remain in the window even after they are completed, until I3 completes execution; instead of being pushed out of the FIFO and replaced by three new instructions. This stalls the instruction stream (i.e., a bottleneck) and tends to limit performance.

One solution for fixed advance windows (FIFOs) is an instruction window that can be advanced by a variable amount. This would permit instructions to be removed from the window immediately after they have been executed. Instruction execution is much more complex using variable advance windows, since an instruction may be located in several places in the FIFO. For example, if I1 is executed during the same cycle that I0 is retiring (completed), then in the next cycle I0 will be pushed out of the FIFO, and I1 will move into I0's slot in the FIFO (where I0 and I1 refer to slot locations in a FIFO and not instruction program order). The Superscalar Unit must know that the new I0 was once I1, so that it can retire instructions when they are executed. And the Execution Unit can write corresponding results into correct register files addresses of the functional units.

Although this would improve performance, there are drawbacks associated with this system. Typically, it is necessary to employ a large principal queue (usually in the Superscalar unit) that contains the instructions from the Instruction Fetch Unit. Additionally, several other centrally located queues would need to contain the decoded information associated with each instruction located in the principal queue (i.e., a resource queue, a destination register queue, etc.). The principal queue and the queues that contain the decoded information, would all need to advance in parallel in order to keep track of instructions (i.e., where they should be sent, when they are executed, etc.).

Currently, the idea of using several queues to contain instructions is disadvantageous, for many reasons including: a large amount of chip area resources are dedicated to a plurality of queues; there is not as much flexibility in designing a system with more than one queue; and control logic for directing data in queues is intricate and inflexible.

3

Therefore, what is needed is a technique to "track" or monitor instructions after they are decoded. The system must require a small area on a chip, be flexible and be able to properly monitor instructions as they advance through a "Variable Advance Instruction Window."

SUMMARY OF INVENTION

The present invention is directed to a technique of monitoring instruction execution of multiple instructions in parallel by a system that assigns tags to the multiple instructions. The system is a component of a superscalar unit which is coupled between an instruction fetch unit (which sends instructions from a memory unit) and an execution unit (which executes the instructions). The superscalar unit is in charge of directing instructions to various functional units in the execution unit and notifying the instruction fetch unit when instructions are executed or no longer needed (retired) so that the instruction fetch unit can forward additional instructions to the execution unit. The present invention provides a mechanism for the superscalar unit to monitor instructions (which may execute out-of-program order) and advance in the instructions in the "instruction window" in a variable fashion.

The present invention employs a tag monitor system, which is a part of the superscalar unit. The tag monitor system includes: a register file and a queue that operates on a First-In-First-Out basis (FIFO). The register file is coupled to the instruction fetch unit and is used to store decoded instructions (i.e., resource requirements of each instruction). The queue is coupled to the register file. Each slot of the queue contains a tag. When an instruction is sent from the instruction fetch unit it is assigned a tag that is not currently assigned to any active decoded instructions being stored in the register file. The instruction is then stored in the register file at an address location indicated by the tag in the register file.

Each time an instruction is retired, the queue advances (the queue advances in instruction program order). Typically, a tag is pushed out the bottom of the queue when its respective instruction is retired. That tag can be reassigned to a new instruction sent from the instruction fetch unit. Accordingly, the tag is then sent back to the top of the queue (in other words, it is recycled). During every processor cycle each slot of the queue is output to a read enable port of the register file, which displays the register file's contents in program order. The queue will typically advance by the number of instructions that retire from a previous execution cycle.

The register file has write ports where instructions are received from the instruction fetch unit. The maximum number of instructions that can be written into the register file is determined by the maximum number of instructions (tags) that can be advanced at one time by the queue. The output port of the register file (read data port) has a port for every instruction stored in the register file (corresponding to the number of slots of the queue).

One feature of the present invention is that decoded instructions can be identified without the need for multiple queues. This simplifies design and increases operational flexibility. Additionally, the amount of area required on a chip is reduced.

Further features and advantages of the present invention, as well as the structure and operation of various embodiments of the present invention, are described in detail below with reference to the accompanying drawings.

Figure 1:
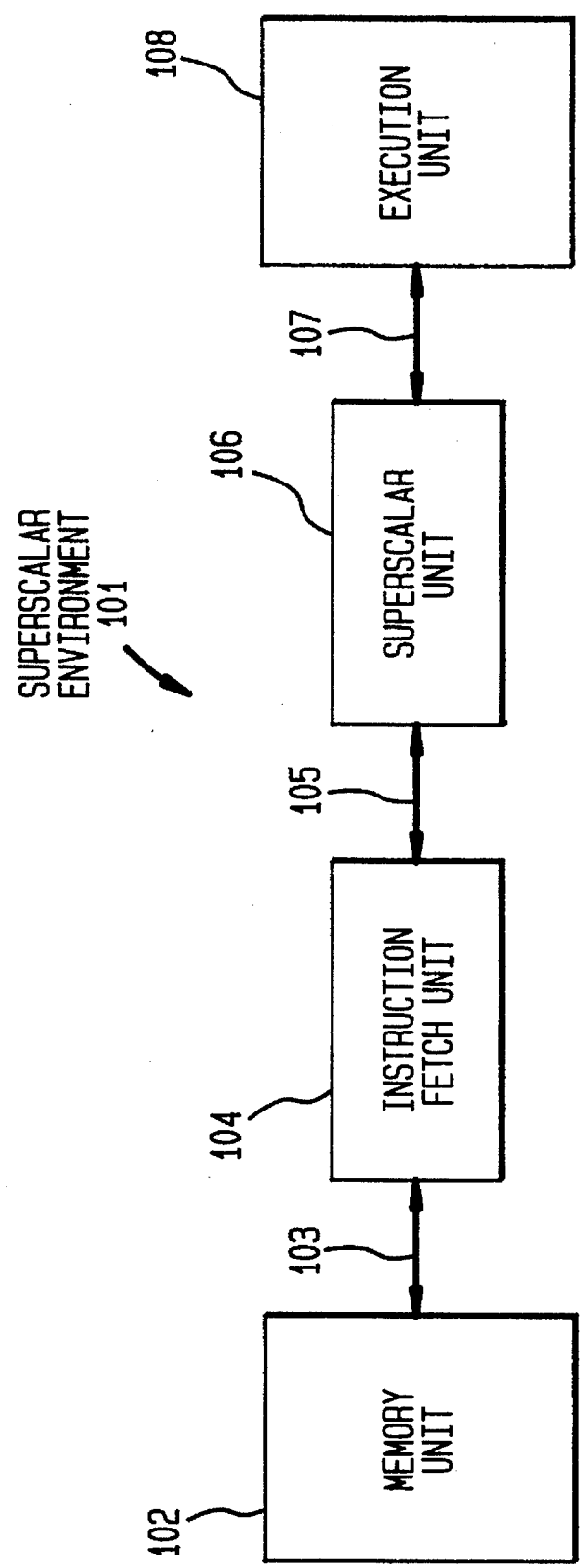
FIG. 1 is a block diagram of a superscalar environment 101.

The left-most digit of a reference number identifies the drawing in which the reference number first appears.

DETAILED DESCRIPTION OF THE INVENTION 1.0 System Environment

FIG. 1 is a block diagram of a superscalar environment 101. Superscalar environment 101 includes: a Memory Unit 102, an Instruction Fetch Unit 104, a SuperScalar Unit 106, and an Execution Unit 108.

Superscalar unit 106 controls execution of instructions that occurs in the execution unit 108. The execution unit 108 may include functional units such as a floating-point unit (not shown), an integer unit (not shown), a load/store unit (not shown) and other such functional units commonly used by processors depending on the desired application.

Instruction fetch unit 104 fetches a group of instructions from memory 102 via a bus 103, decodes them and sends them to superscalar unit 106 via a bus 105. Superscalar unit 106 then issues the instructions to the execution unit 108. Generally, the superscalar unit 106 monitors execution unit 108 availability and checks for dependencies between instructions. Once the instructions are completed, superscalar unit 106 retires instructions. This is performed by removing completed instructions from a window in superscalar unit 106 (to be described). Superscalar unit 106 can then send a signal on bus 105 to direct instruction fetch unit 104 to send more instructions. This enables superscalar unit 106 to refresh the window (not shown, in FIG. 1) with new instructions.

In the preferred embodiment instructions have a fixed length of 32 bits. Busses shown in FIG. 1 represent data and control signals. Bus and instruction size may vary depending on the application. The remaining discussion will be focused on a tag monitor system, which tracks instructions in superscalar unit 106.

2.0 Operation and Structure of the Tag Monitor System

A. Structure

Figure 2:
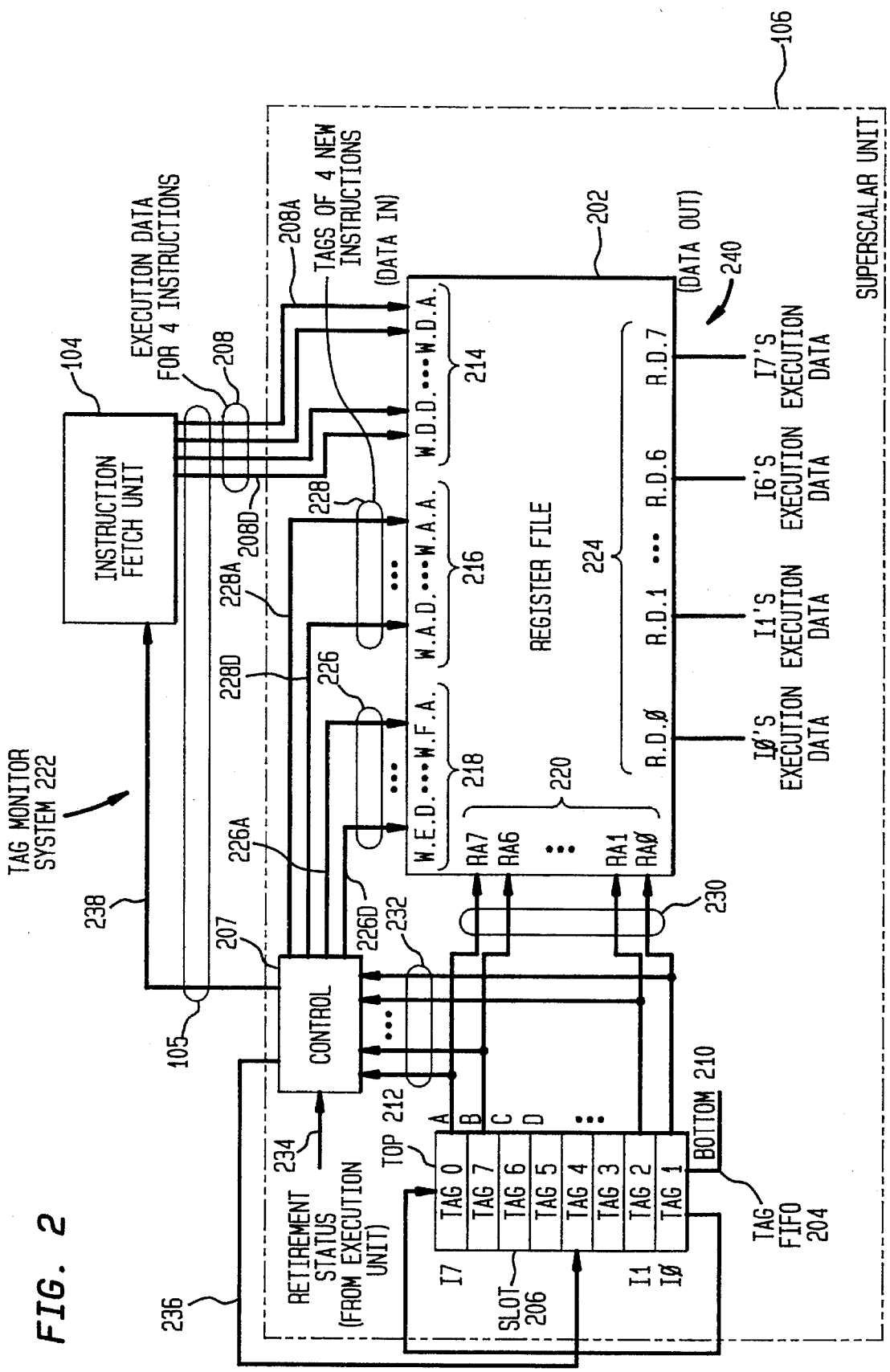
FIG. 2 shows a block diagram of a Tag Monitor System 222 located within a portion of superscalar unit 106 (shown as dotted lines).

FIG. 2 shows a block diagram of a Tag Monitor System 222 located within a portion of superscalar unit 106 (shown as dotted lines). Tag Monitor System 222 includes: a Register File 202, a Tag FIFO 204, and control logic 207.

Tag FIFO 204 is a queue that stores (or holds) tags 0–7 located in slots 206. A tag is a unique label (a binary digit 0–7) assigned to an instruction at the time an instruction is transferred from the instruction fetch unit 104 and stored in the superscalar unit 106 in register file 202.

Once a tag is assigned to an instruction, it will remain with that instruction until the instruction is retired. An instruction is retired after: 1) it results have been compared or stored; and/or 2) it has been executed by execution unit 108, and/or is no longer needed for any reason. Once an instruction is retired, the corresponding tag is pushed out the bottom 210 of tag FIFO 204 and sent back to the top 212 of tag FIFO 204. Now, the tag is reassigned to a new instruction sent from the instruction fetch unit 104. In this fashion tags are "recycled" or are recirculated in tag FIFO 204 (sometimes referred to as a recycling queue).

Register file 202 is coupled to tag FIFO 204 and instruction fetch unit 104. Register file 202 stores execution data, e.g., (destination register in execution unit 108, resource requirements, operation function) of an instruction sent from instruction fetch unit 104. Register file 202 includes: a write data port 214, a write address port 216, a write enable port 218, a read address port 220, and read data port 224. Register file 202 is a random access memory.

Write data port 214 receives instruction execution data from instruction fetch unit 104. Instruction execution data is transported on busses 208. As shown in FIG. 2, W.D.A stands for "write instruction execution data A" and W.D.B. stands for "write instruction execution data B" and so forth. Letters are used to identify instructions to avoid confusion with instruction program order.

Write address ports 216 specify what tag location in register file 202 to store instructions. Write address port 216 is coupled to control logic 207. Write enable port 218 is also coupled to control logic 207. Active enable signals 226 will permit data be written into register file 202.

Read address port 220 is coupled to tag FIFO 204 via busses (outputs) 230. Each slot 206 in tag FIFO 204 is coupled as an output signal to a read address port 230 (R.A.7-R.A.0). Accordingly, read address port 220 will enable the contents of register file 202 to be selected by tag FIFO 204 and read from read data port 224. The outputs 230 of tag FIFO 204 permit the register file 202 to display its contents in order. In other words, outputs 230 show the decoded instructions in program order.

Typically, register file 202 is connected to other elements (e.g. an issuer not shown) located within super-scalar unit 106, which require instructions to appear in program order.

To reiterate, a decoded instruction is stored in register file 202 by tag. For instance, if instruction B is assigned tag 4, then its decoded information will be stored in address 4 of register file 202.

Control logic 207 is comprised of logic circuits. Control logic 207 monitors the execution unit 108 via bus 234 and tag FIFO 204. Control logic 207 will signal the instruction fetch unit 104 to send new instructions to register file 202, once an instruction is retired. Control logic 207 will also indicate how many new instructions for instruction fetch unit 104 to send. In the preferred embodiment the maximum number of instructions that can be sent at one time is 4, which corresponds to the write ports 216 in register file 202. Control logic 204 will also synchronize tag FIFO 204 to advance the same number of instruction requested via a signal 236. Tag FIFO can advance 1, 2, 3 or 4 steps at a time. The circuit implementation for control logic 207 would be readily apparent to those skilled in the art. For example, currently well known and commercially available logic and layout systems can be used to convert a behavior description (i.e., Verilog or V.H.D.L.) to a silicon or chip design.

B. Operation

Figure 3:
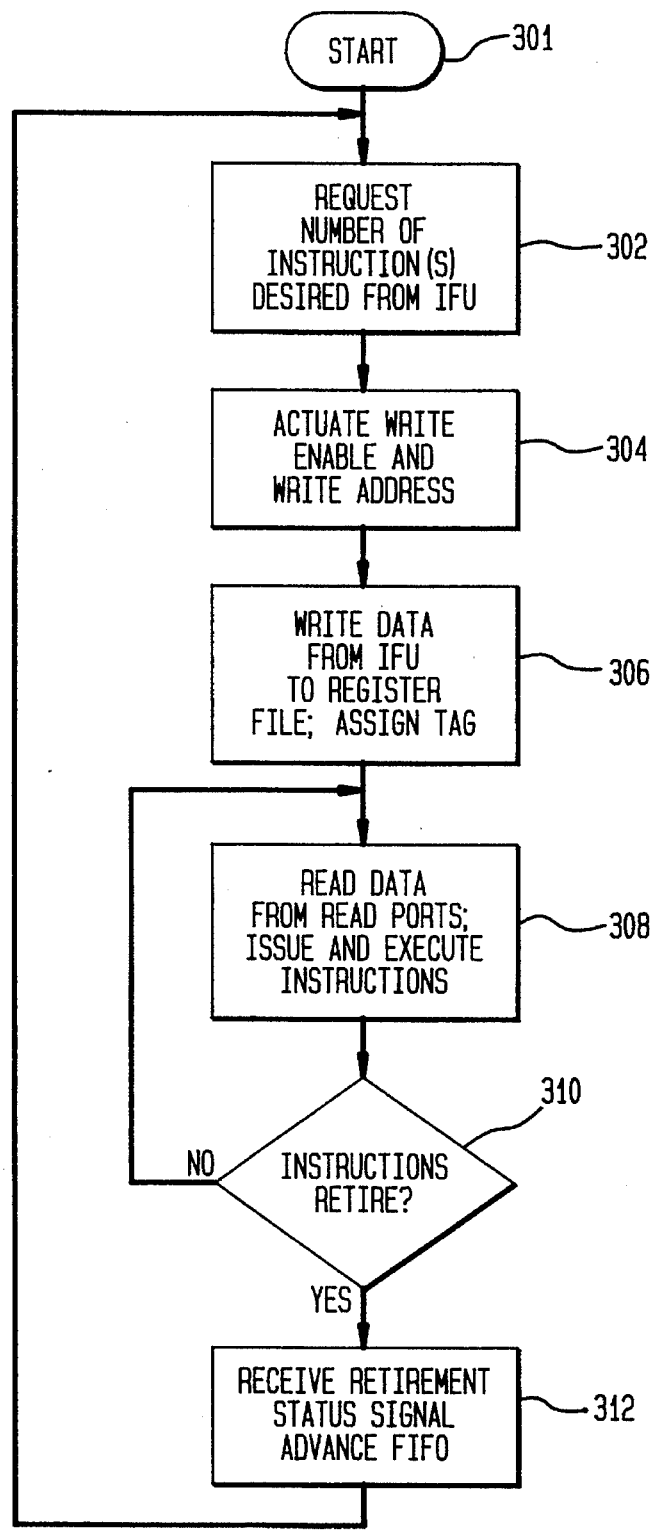
FIG. 3 is a flow chart illustrating the operation of tag monitor system 222.

FIG. 3 is a flow chart illustrating the operation of tag monitor system 222. Operational steps 301–312 will be described with reference to hardware elements of FIGS. 1 and 2.

In step 302, control logic 207 sends a request dam signal 238 to instruction fetch unit 104 indicating the number of instruction(s) needed. For example, if one instruction is needed to fill a gap (due to instruction retirement) in register file 202, then control logic 207 will send a request data signal 238 to instruction fetch unit 104 requesting a new instruction for execution.

In step 304, control logic 207 sends an active logic signal 228 and 226 to write address port 216 and write enable port 218, respectively. Control logic 304 will only activate write ports that correspond to slots A–D that have received a newly retired tag. For example, if tag FIFO 106 advanced by one in step 312 previously (to be described), then tag 0 would appear in slot I7, which corresponds to instruction address A. Accordingly, only write address signal 228A and write enable signal 226A is activated, by control logic 207 in this example. Thus, only port 216A is enabled.

In step 306, instruction(s) (instruction execution data) are sent from the instruction fetch unit 104 to register file 202 via bus 208. Instructions sent from the instruction fetch unit 104 are stored in the register file by tag numbers assigned to those instructions. In other words, instructions are written into register file 202 at an address location indicated by the corresponding tag number from one or more (depending on how many instructions are sent from instruction fetch unit 104) of the first four slots (A,B,C,D) of tag FIFO 204, which are sent to write address port 216. For example, if one instruction is sent from instruction fetch unit 104 to register file 202, it will be transferred on bus 208A. It is stored in address location "0" according to tile tag located in tile top slot (I7 location) of tag FIFO 204, which is read out of tag FIFO via bus 232A; transported through control 207 and sent to write address port 216A via bus 228A.

In step 308, instructions are read out of register file read data port 224. Register file 202 will display its contents in program order. Each slot 206 of tag FIFO 204 is output and transported on busses 230 to read address port 220. Read address port 220 enables contents (dam out 240) from register file to be displayed. Outputs 230 of tag FIFO 204 show a "snap shot" of the actual program order, because tag FIFO 204 is always in sync with variable advanced instructions sent from instruction fetch unit 104 and instruction retirement. Thus, as a result of having outputs 230 of tag FIFO 204 coupled to read address port 220, data outputs 240 of register file 202 will show execution data of the instructions in program order. For example, read address port 7 (R.A.7) will enable I7's instruction data (which corresponds to tag 0), to be read out of read data port 7 (R.D.7) and tag 1 will read out I0's execution data.

Additionally, in step 308, the read-out decoded-instructions are issued to the execution unit 108 and executed.

In decisional step 310, control 307 waits for any instructions to retire. If no instructions retire data will continue to be read out of register file 202, as indicated by the "NO" path of decisional step 310. If instructions do retire control logic 207 will receive an active retirement status signal 234, as shown in step 312. Retirement status signal 234 indicates to control logic 207 how many empty slots (how many slots to advance tag FIFO 204) need to be filled in tag FIFO 204. An empty space can also occur in tag FIFO 204 where there are invalid instructions (i.e., cache misses, branches, etc.) sent from instruction fetch unit 104. Additionally, in step 312 control logic 207 sends an advance data signal 236 to tag FIFO 204 indicating the number(s) (corresponding to number of instructions needed) of times to advance tag FIFO 204. Referring to FIG. 2, tag 1 will move into I7's slot and all other tags will be advanced accordingly. Tag 2 should be located at the bottom 210 of tag FIFO 206 after step 312. Now, the operation of tag monitor system 222 will continue by returning to operational step 302 discussed above.

While various embodiments of the present invention have been described above, it should be understood that they have been presented by way of example only, and are not intended to be limiting. Thus, the breadth and scope of the present invention should not be limited by any of the above described exemplary embodiments, but should be defined only in accordance with the filing claims and their equivalents.

What is claimed is:

1. A system for tracking instructions in a variable advance instruction window of a predetermined size, comprising:

control logic that identifies an increment of advancement in the variable advance instruction window, requests an instruction source to send, to a register file, decoded instruction information for a set of instructions equal in number to said increment of advancement, and assigns a tag to each new instruction that enters the variable advance instruction window, wherein said tag comprises a unique address in said register file where said decoded instruction information is to be stored; and a recycling queue comprising a plurality of slots equal in number to the predetermined size of the instruction window, each of said plurality of slots containing one of said tags, wherein an order defined by a position of said assigned tags in said recycling queue corresponds to the order of instructions in the variable advance instruction window.

2. The system of claim 1, wherein said tags in each of said plurality of slots of said recycling queue are used to output said decoded instruction information.

3. The system of claim 2, wherein said tags in each of said plurality of slots of said recycling queue are applied to read address ports of said register file to output said decoded instruction information, in program order, at corresponding read data ports of said register file.

4. The system of claim 1, wherein said decoded instruction information specifies functional unit requirements.

5. The system of claim 1, wherein said decoded instruction information specifies types of operations to be performed.

6. The system of claim 1, wherein said decoded instruction information specifies storage locations where instruction results are to be stored.

7. The system of claim 1, wherein said decoded instruction information specifies storage locations where instruction operands are stored.

8. A system for tracking instructions in a variable advance instruction window of a predetermined size, comprising:

control logic that identifies an increment of advancement in the variable advance instruction window, requests an instruction source to send, to a register file, decoded instruction information for a set of instructions equal in number to said increment of advancement, and assigns a tag to each new instruction that enters the variable advance instruction window, wherein said tag comprises a unique address in said register file where said decoded instruction information is to be stored; and a recycling queue comprising a plurality of slots, each of said plurality of slots containing one of said tags, wherein an order defined by a position of said assigned tags in said recycling queue corresponds to the order of instructions in the variable advance instruction window, wherein said tags in said plurality of slots of said recycling queue are applied to read address ports of said register file to output said decoded instruction information, in program order, at corresponding read data ports of said register file.

9. The system of claim 8, wherein said recycling queue comprises a plurality of slots equal in number to the predetermined size of the instruction window.

10. The system of claim 8, wherein said decoded instruction information specifies functional unit requirements.

11. The system of claim 8, wherein said decoded instruction information specifies types of operations to be performed.

12. The system of claim 8, wherein said decoded instruction information specifies storage locations where instruction results are to be stored.

13. The system of claim 8, wherein said decoded instruction information specifies storage locations where instruction operands are stored.

14. A computer system, comprising:

a memory unit for storing program instructions;

a bus coupled to said memory for retrieving said program instructions; and a processor coupled to said bus, wherein said processor comprises a tag monitoring system for tracking instructions in a variable advance instruction window of a predetermined size, wherein said tag monitoring system comprises:

control logic that identifies an increment of advancement in the variable advance instruction window, requests an instruction source to send, to a register file, decoded instruction information for a set of instructions equal in number to said increment of advancement, and assigns a tag to each new instruction that enters the variable advance instruction window, wherein said tag comprises a unique address in said register file where said decoded instruction information is to be stored; and a recycling queue comprising a plurality of slots equal in number to the predetermined size of the instruction window, each of said plurality of slots containing one of said tags, wherein an order defined by a position of said assigned tags in said recycling queue corresponds to the order of instructions in the variable advance instruction window wherein said tags in said plurality of slots of said recycling queue are applied to read address ports of said register file to output said decoded instruction information, in program order, at corresponding read data ports of said register file.

15. A method for tracking instructions in a variable advance instruction window of a predetermined size, comprising the steps of:

(a) assigning a tag to each new instruction that enters the variable advance instruction window, wherein said tag comprises a unique address within a register file;

(b) storing decoded instruction information related to each instruction in said register file in a location specified by the tag assigned to that instruction; and (c) storing each tag in a slot of a recycling queue, said recycling queue comprising a number of slots equal to the predetermined size of the variable advance instruction window, wherein an order defined by a position of said tags in said recycling queue corresponds to the order of instructions in the variable advance instruction window.

16. The method of claim 15, further comprising the step of:

(d) using said tags stored in said slots of said queue to output said decoded instruction information in program order.

17. The method of claim 16, wherein step (d) comprises the step of passing said tags stored in said slots of said recycling queue to a plurality of read address ports of said register file to cause said register file to output said decoded instruction information, in program order, at a plurality of read data ports of said register file.

18. The method of claim 15, wherein said step for storing the decoded instruction information comprises storing information specifying functional unit requirements.

19. The method of claim 15, wherein said step for storing the decoded instruction information comprises storing information specifying a type of operation to be performed.

20. The method of claim 15, wherein said step for storing the decoded instruction information comprises storing information specifying a storage location where instruction results are to be stored.

21. The method of claim 15, wherein said step for storing the decoded instruction information comprises storing information specifying a storage location where instruction operands are stored.

22. The computer system of claim 14, wherein said recycling queue comprises a plurality of slots equal in number to the predetermined size of the instruction window.

23. The computer system of claim 14, wherein said decoded instruction information specifies functional unit requirements.

24. The computer system of claim 14, wherein said decoded instruction information specifies types of operations to be performed.

25. The computer system of claim 14, wherein said decoded instruction information specifies storage locations where instruction results are to be stored.

26. The computer system of claim 14, wherein said decoded instruction information specifies storage locations where instruction operands are stored.

27. A computer system, comprising:

a memory unit for storing program instructions;

a bus coupled to said memory for retrieving said program instructions; and a processor coupled to said bus, wherein said processor comprises a tag monitoring system for tracking instructions in a variable advance instruction window of a predetermined size, wherein said tag monitoring system comprises:

control logic that identifies an increment of advancement in the variable advance instruction window, requests an instruction source to send, to a register file, decoded instruction information for a set of instructions equal in number to said increment of advancement, and assigns a tag to each new instruction that enters the variable advance instruction window, wherein said tag comprises a unique address in said register file where said decoded instruction information is to be stored; and a recycling queue comprising a plurality of slots equal in number to the predetermined size of the instruction window, each of said plurality of slots containing one of said tags, wherein an order defined by a position of said assigned tags in said recycling queue corresponds to the order of instructions in the variable advance instruction window.

28. The computer system of claim 27, wherein said tags in each of said plurality of slots of said recycling queue are used to output said decoded instruction information.

29. The computer system of claim 28, wherein said tags in each of said plurality of slots of said recycling queue are applied to read address ports of said register file to output said decoded instruction information, in program order, at corresponding read data ports of said register file.

30. The computer system of claim 27, wherein said decoded instruction information specifies functional unit requirements.

31. The computer system of claim 27, wherein said decoded instruction information specifies types of operations to be performed.

32. The computer system of claim 27, wherein said decoded instruction information specifies storage locations where instruction results are to be stored.

33. The computer system of claim 27, wherein said decoded instruction information specifies storage locations where instruction operands are stored.

34. A method for tracking instructions in a variable advance instruction window of a predetermined size, comprising the steps of:

(a) assigning a tag to each new instruction that enters the variable advance instruction window, wherein said tag comprises a unique address within a register file;

(b) storing decoded instruction information related to each instruction in said register file in a location specified by the tag assigned to that instruction;

(c) storing each tag in a slot of a recycling queue, wherein an order defined by a position of said tags in said recycling queue corresponds to the order of instructions in the variable advance instruction window; and (d) applying said tags in said plurality of slots of said recycling queue to read address ports of said register file to output said decoded instruction information at corresponding read data ports of said register file.

35. The method of claim 34, wherein said step (c) comprises the step of storing each tag in a slot of a recycling queue, said recycling queue comprising a plurality of slots equal in number to the predetermined size of the instruction window.

36. The method of claim 15, wherein said step for storing the decoded instruction information comprises storing information specifying functional unit requirements.

37. The method of claim 34, wherein said step for storing the decoded instruction information comprises storing information specifying a type of operation to be performed.

38. The method of claim 34, wherein said step for storing the decoded instruction information comprises storing information specifying a storage location where instruction results are to be stored.

39. The method of claim 34, wherein said step for storing the decoded instruction information comprises storing information specifying a storage location where instruction operands are stored.

40. The method of claim 34, wherein said step (d) comprises the step of applying said tags to read address ports of said register file to output said decoded instruction information, in program order, at corresponding read data ports of said register file.

* * * * *